US005790654A

United States Patent [19]

Eklof

[11] Patent Number: 5,790,654
[45] Date of Patent: Aug. 4, 1998

[54] DIGITALLY CONTROLLED RING SIGNAL GENERATOR

[75] Inventor: Anders Eklof, Poolesville, Md.

[73] Assignee: Telogy Networks, Inc., Germantown, Md.

[21] Appl. No.: 692,206

[22] Filed: Aug. 5, 1996

[51] Int. Cl.$^6$ ............................................. H02M 7/48
[52] U.S. Cl. .................... 379/375; 379/373; 379/418; 363/31; 363/37
[58] Field of Search ......................... 379/375, 373, 379/377, 413, 418; 363/31, 37, 63, 73, 74

[56] References Cited

U.S. PATENT DOCUMENTS

| | | | |
|---|---|---|---|
| 4,056,693 | 11/1977 | Bosik et al. | 379/418 |
| 4,631,361 | 12/1986 | Miller | 379/351 |
| 4,827,503 | 5/1989 | Takato et al. | 379/373 |
| 4,925,511 | 5/1990 | Burns et al. | 379/418 |
| 4,942,600 | 7/1990 | Suzuki | 379/350 |
| 5,307,407 | 4/1994 | Wendt et al. | 379/418 |
| 5,321,596 | 6/1994 | Hurst | 379/418 |
| 5,323,456 | 6/1994 | Oprea | 379/375 |
| 5,363,443 | 11/1994 | Petty | 379/418 |
| 5,402,480 | 3/1995 | Hirahara | 379/253 |
| 5,426,695 | 6/1995 | Misu | 379/252 |
| 5,490,054 | 2/1996 | Hanebrink, Jr. | 363/21 |
| 5,491,746 | 2/1996 | Pinard | 379/373 |
| 5,555,301 | 9/1996 | Boike et al. | 379/413 |
| 5,563,943 | 10/1996 | Takebayashi et al. | 379/373 |

Primary Examiner—Krista Zele
Assistant Examiner—Jacques M. Saint-Lurin
Attorney, Agent, or Firm—Roberts & Brownell, LLC

[57] ABSTRACT

A space and power efficient digitally controlled, all solid state, DC to AC converter powered by low voltage DC, typically found in logic circuits, that generate a high voltage low frequency AC output with a low slew rate waveform, suitable for activation of an electro-mechanical bell or electronic ringer in a telephone. The present invention is particularly suited for application in small, wireless terminals used to provide telephone services via satellite or terrestrial radio to single users or a small number of users as found in a PBX. The present invention is also particularly suited for battery or solar powered equipment where power efficiency is of significant value.

6 Claims, 6 Drawing Sheets

DIGITALLY CONTROLLED RING SIGNAL GENERATOR

FIELD OF THE INVENTION

This invention relates generally to space and power efficient digitally controlled DC to AC power conversion and more specifically to generation of low slew rate, low frequency, high voltage AC output waveforms for activation of telephone electro-mechanical bell or electronic ringers using small low cost circuits powered by low voltage DC typically found in logic circuits.

DESCRIPTION OF RELATED ART

To alert a customer to an incoming call, the telephone network provides a low frequency AC signal on the telephone line, causing the telephone to ring. The frequency of the signal is in the 16–67 Hz range with an RMS value of 40 to 150 volts. The ideal ring signal waveform approximates a sine wave.

In central telephone offices, large ringing signal generators are shared by many telephone lines. The size, weight and cost of the generators are therefore not of great concern. In small, wireless terminals used to provide service via satellite or terrestrial radio for a small number of users, in some cases a single telephone, the situation is quite different. Size, weight and cost become important issues, and where the equipment is battery and/or solar powered, efficiency is of significant value.

Electro-mechanical devices like vibrating commutators/transformers and motor generators are too bulky and heavy to be considered in such equipment, thus electronic circuits involving switching DC to DC converters are typically used to generate a high DC voltage in the 50–100 volt range, with a polarity switching bridge employed to convert this voltage into an AC signal, having a square waveform. Low pass filtering is highly desirable before the signal is applied to the telephone line, but filtering at the low frequencies of the ring signal requires physically large and expensive components. As a compromise, the output signal is often left as essentially a squarewave, although the high frequency content has been reduced.

None of the above technology addresses the need for space and power efficient digitally controlled DC to AC conversion with low slew rate, low frequency, high voltage AC output waveforms for activation of telephone electro-mechanical bell or electronic ringers using small low cost circuits powered by low voltage DC typically found in logic circuits.

SUMMARY OF THE INVENTION

It is therefore an objective of the present invention to provide a digitally controlled, very compact, efficient, reliable, and low cost ring signal generator suitable for incorporation into telephone line interfaces where a ringing signal is needed to alert a user to the arrival of an incoming call.

It is a further object of the present invention to provide a limited slew rate AC output wave with the most desirable waveform approaching a sine wave.

It is a further object of the present invention to provide a low frequency (typically between 16 and 67 Hz), high voltage (typically 40 to 150 volts RMS) AC output waveform.

It is a further object of the present invention to accommodate nonlinear resistive loads.

It is a further object of the present invention to accommodate partly capacitive and/or inductive loads without causing voltage spikes or resonant oscillations in any part of the ring waveform.

It is a farther object of the present invention to allow detection of an off hook condition by allowing passage of DC current on the telephone line while the ring signal is being generated.

It is a further object of the present invention to isolate surges and spikes induced by AC lines and lightning on the telephone line from the low voltage logic circuits in the vicinity of the ring generator.

It is a further object of the present invention to isolate surges and spikes by allowing the ring generator output to float with respect to the power and ground connections needed to operate the ring generator from the low voltage source.

It is a further object of the present invention to provide different sounding ring signals through different cadence and frequency on the same telephone line so that party line subscribers can tell for whom an incoming call is intended.

It is a further object of the present invention to provide an option to eliminate the need for the dual form C relay typically used to connect and disconnect the ring generator.

These and other objectives of the present invention will become obvious to those skilled in the art upon review of the following disclosure.

The present invention is a digitally controlled, very compact, efficient and reliable, yet low cost ring signal generator suited for incorporation into telephone line interfaces where a ring signal has to be connected to the line to alert a user to the arrival of an incoming call.

DETAILED DESCRIPTION OF THE PREFERRED EMBODIMENT

Figure 1:
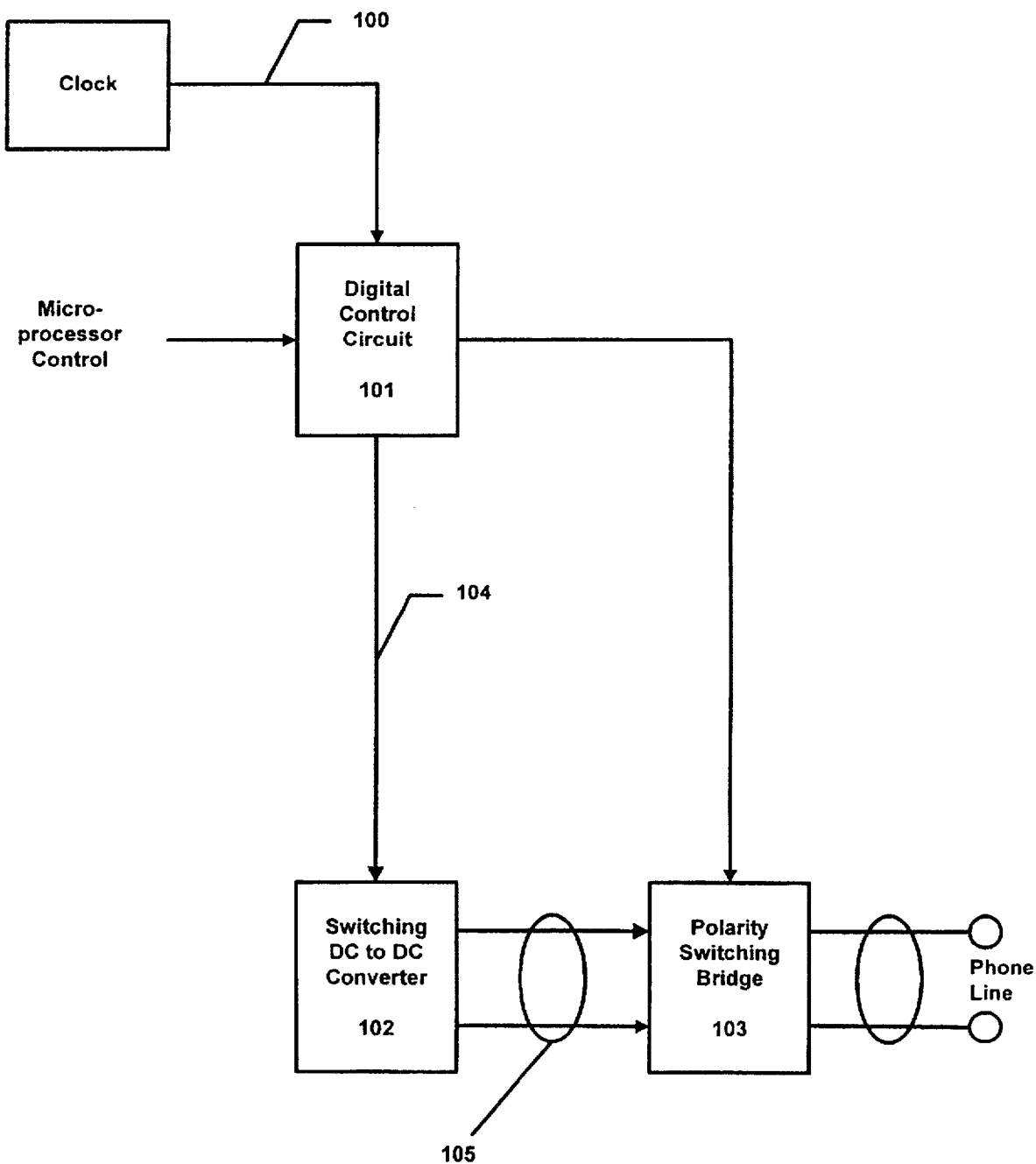
FIG. 1: Illustrates an overall diagram of the preferred embodiment of the present invention.

Referring to FIG. 1, the present invention comprises a digital control circuit 101, a high efficiency switching DC to DC converter 102, and a polarity switching bridge 103.

Figure 2:
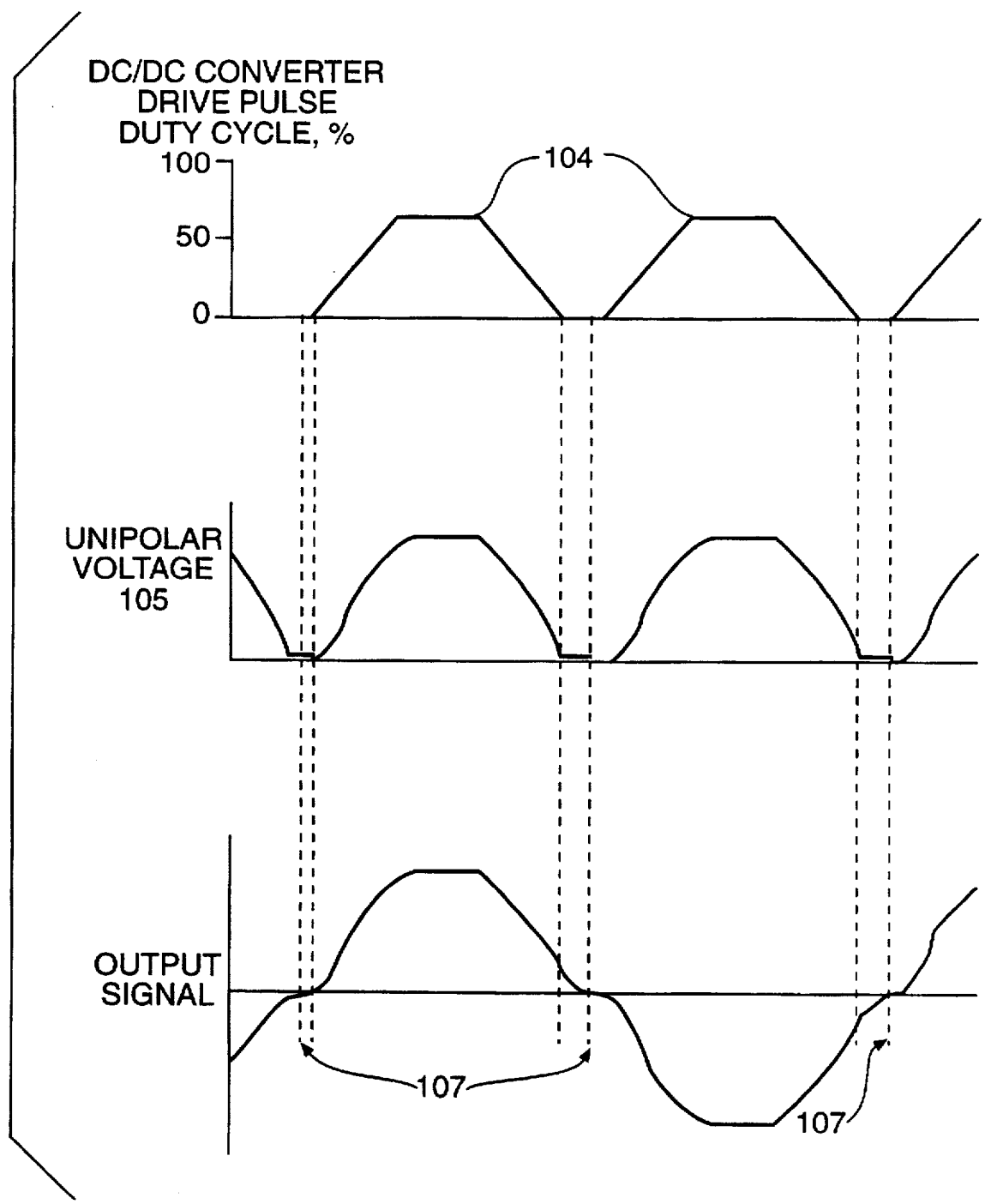
FIG. 2: Illustrates the waveforms at different points in the preferred embodiment of the present invention.

Referring to FIGS. 1 and 2, the present invention creates a waveform that closely approximates a sine wave by controlling the drive pulses 104 to the switching DC to DC converter 102 to create a unipolar amplitude modulated DC voltage 105, and then synchronously operating the polarity switching bridge 103 to switch the output signal polarity at the point where the DC voltage is near zero 107. The unipolar output voltage waveform 105 of the ring signal generator of the present invention is shaped by a gradually rising pulse width of the DC to DC converter drive pulses 104, followed by an interval of constant pulse width. The pulse width is then again gradually decreased to zero, where it remains for a while before the next pulse width modulation cycle begins. The generation of the converter drive pulses and the synchronized operation of the polarity switching bridge 103 are precisely controlled by the digital control circuit 101 to match the characteristics of the components in the DC to DC converter 102 and the expected range of load impedances. In spite of the nonlinear relationships between output voltage and converter drive pulse width, the digital control circuit 101 produces a desirable output AC waveform with very little energy in the frequency band of voice signals and higher, while preserving very high efficiency of the conversion process, and eliminating the need for low frequency filtering.

Figure 3:
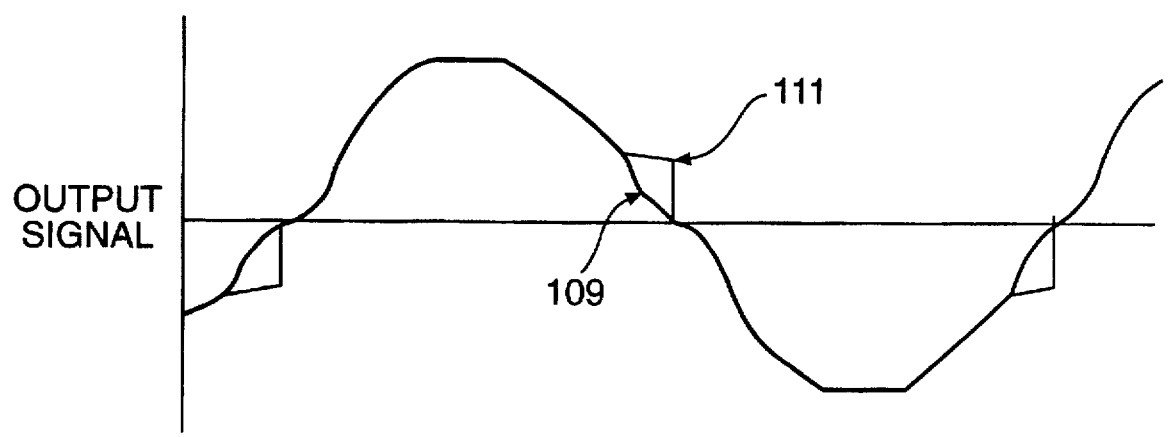
FIG. 3: Illustrates the effect of a highly capacitive load on the output waveform in the preferred embodiment of the present invention.

FIG. 3 illustrates the effect of highly capacitive loads on a typical output waveform with controlled discharge 109 and with uncontrolled discharge 111. A simple DC to DC converter circuit can source current to a highly capacitive load while its output voltage rises, but can not drain the resultant charge from the load when the switch drive is reduced. The output waveform from a simple DC to DC converter approximates that of an uncontrolled discharge 111. In contrast, the present invention achieves a controlled discharge 109 of any voltage that has accumulated on capacitances during the load during one half cycle of the ring signal before the reverse polarity half cycle begins. This controlled discharge 109 helps control the rise and fall times of voltage transitions on the line, and reduces the maximum current that the DC to DC converter has to generate.

Figure 4:
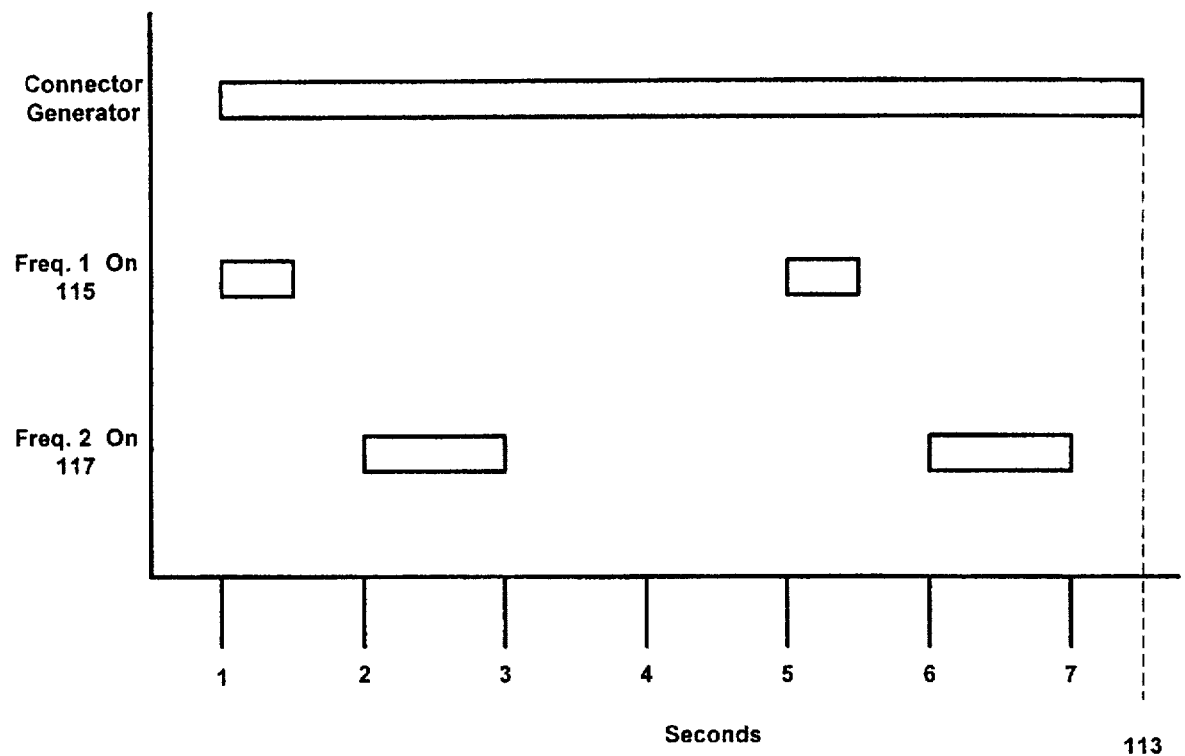
FIG. 4: Illustrates the time/frequency generation of a two frequency cadence ring signal in the preferred embodiment of the present invention.

Referring to FIG. 4, the generation of a two frequency cadence ring is shown. The preferred embodiment of the present invention can connect to the telephone line and generate ring signals of different cadence and frequency for different users on the same party line, or to indicate the type of incoming call. The ring signal generator can also be used to generate ring signals for a small number of users as found in a private branch exchange (PBX). Typically, the ring signal generator is switched into the telephone line circuit by a relay to alert the user to the arrival of an incoming call, with the ring signal cadence generated by that relay. The ring signal generator of the present invention is continuously connected to the line until an off hook condition is detected 113. While connected to the telephone line, the present invention can provide ring signals of different cadence and frequency for different users on the same party line, or to indicate the type of incoming call. A ring signal frequency for one user is illustrated at 115, while the ring signal frequency for another user on the same party line is illustrated at 117. This preferred embodiment of the present invention for continuously connecting the ring signal generator to the line has the advantage of reducing wear on the relay.

The impedance of the ring signal generator is not zero in the voice band. Therefore the ring signal generator must be removed from the telephone line once the telephone is taken offhook to establish a voice path. An alternative embodiment of the present invention adds another pair of optically controlled solid state switches to eliminate the need for the dual form C relay typically used to connect and disconnect the ring generator. This alternative embodiment of the present invention has the advantage of completely eliminating the need for the dual form C relay with any associated wear.

Figure 5:
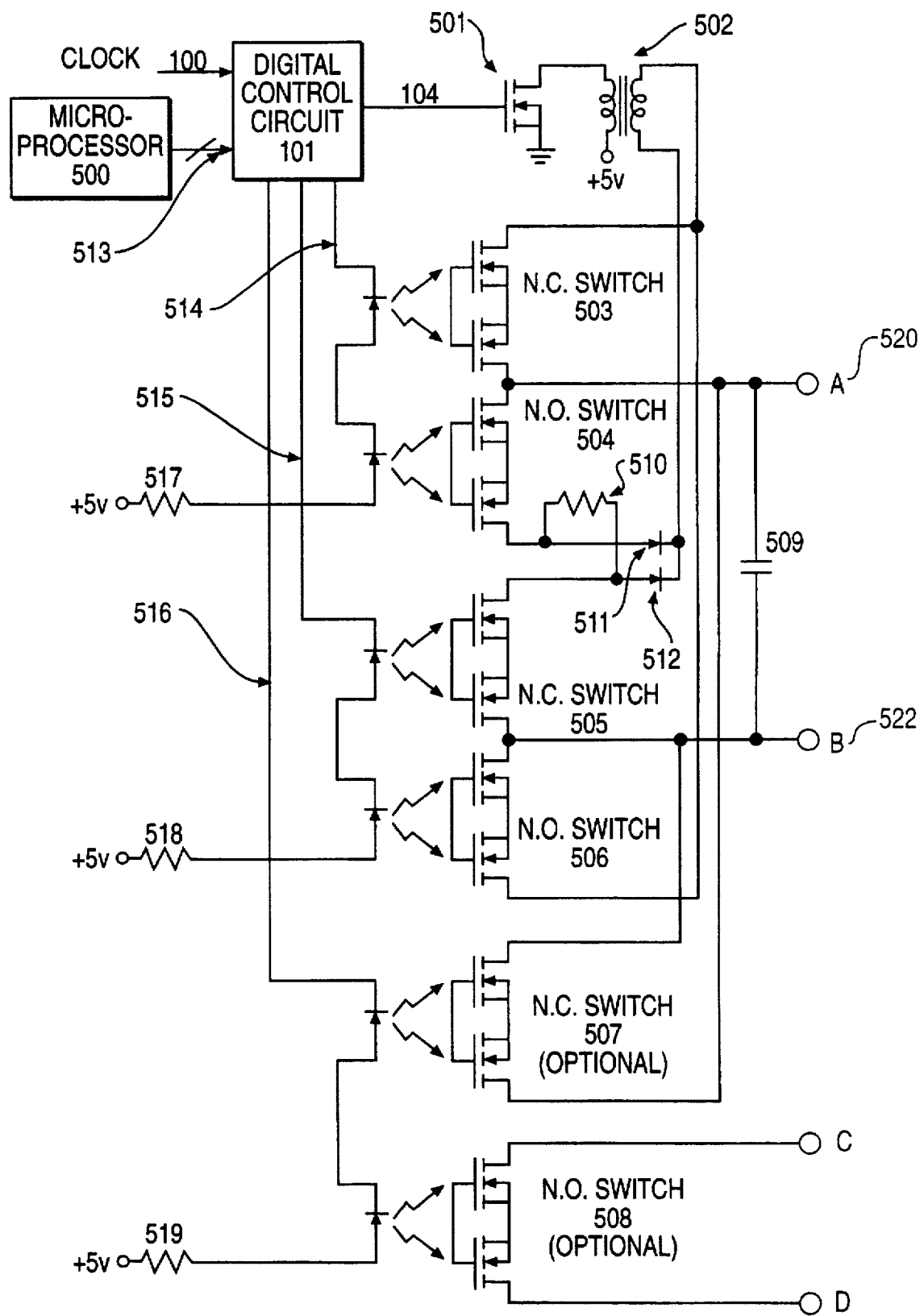
FIG. 5: Illustrates the circuit diagram of the preferred embodiment of the present invention.

Referring to FIG. 5, the circuit diagram of the preferred embodiment is shown. The digital control circuit 101 has inputs that can be controlled by a microprocessor 500. The microprocessor, which is not part of the ring signal generator, can turn the ring signal on and off and select different ring signal frequencies via multiple control leads 513. In the preferred embodiment of the present invention, the ring signal frequencies generated by the digital control circuit 101 are 20, 30, and 42.86 Hz, but any number and value of frequencies can be generated by the same principle through changes to the design of the digital divider circuit and/or changing the frequency of the clock signal 100. The clock can be the clock used to drive the microprocessor 500, or some other convenient, accurate clock present on the same circuit board as the ring signal generator.

Digital control circuit 101 also produces drive signals 514 and 515. Each of those drive signals drives a pair of optically controlled solid state switches (LEDs), where each pair contains one normally closed (N.C.) and one normally opened (N.O.) switch. When the drive signal to the LEDs is applied, the normally open path is closed, and the normally closed path is opened, making the pair act as a form C relay. The connection of the switches creates a path for DC line current through the circuit when neither drive signal is active, as is the case when no ring signal is generated. The path exists from output terminal A 520, through switch 503, transformer 502, diode 512 and switch 505 to output terminal B 522. An off hook detection is therefore possible with the ring signal generator in the circuit, whether or not a ring signal is actually produced. This allows the ring cadence to be controlled by turning the ring signal generator on and off rather than by switching it into and out of the circuit as previously described and illustrated in FIG. 4.

The dual form C relay that is typically used to generate the ring cadence by switching the ring signal generator on and off the line can be eliminated in the present invention with switch pair 507 and 508. When the ring signal is applied to the line, switch 508 is used to ground the tip side of the telephone line, while switch 507 is open. At other times, switch 508 is open, while switch 507 provides a low resistance shunt for the ring generator. The generator circuitry can therefore remain connected in series with the ring lead at all times.

Referring further to FIGS. 3 and 5, the present invention achieves a controlled discharge 109 of any voltage that has accumulated on highly capacitive loads during one half cycle of the ring signal before the reverse polarity half cycle begins. This controlled discharge 109 helps control the rise and fall times of voltage transitions on the line, and reduces the maximum current that the DC to DC converter has to generate. The bridge drive signals are timed so that for a brief period of each ring signal half cycle, only signal 514 is active, which allows the controlled discharge 109 from any highly capacitive load. During the time that only signal 514 is active, the DC to DC converter is disconnected from the output, and resistor 510 is connected to switches 504 and 505 across the output, draining off any residual voltage accumulated by high capacitances in the load, and on a filter capacitor 509. Diodes 511 and 512, which serve as rectifier diodes for the DC to DC converter, block current from flowing through them past the resistor 510. The DC to DC converter is then reconnected by the bridge, however, the output polarity is opposite to the previous half cycle. The bridge connections allow the single filter capacitor 509 to be used in the DC to DC conversion process, with the direction of its charge path reversed to create alternating polarity of the output signal. The unipolar, controlled waveform signal at 105, that was illustrated in FIGS. 1 and 2, exists alternatingly between the cathode of diode 511 and the cathode of diode 512 with respect to the top of the secondary winding of transformer 502.

Referring further to FIG. 5, digital control circuit 101 also produces the drive pulses to the power transistor 501. While the DC to DC converter is disconnected from the output, or the ring signal generator is turned off, no pulses are generated to transistor 501.

The preferred embodiment of the present invention also isolates the ring signal from the digital circuit and its power supply by coupling the switching DC to DC converter via transformer 502 and employing optically controlled solid state switches 503, 504, 505, 506, 507 and 508 in the circuit metallically connected to the output terminals 520 and 522.

Referring further to FIG. 5, switches 503, 504, 505, and 506 comprise the polarity switching bridge. As previously discussed, switches 507 and 508 comprise an alternative embodiment of the present invention to eliminate the need for an electro-mechanical dual form C relay.

Figure 6:
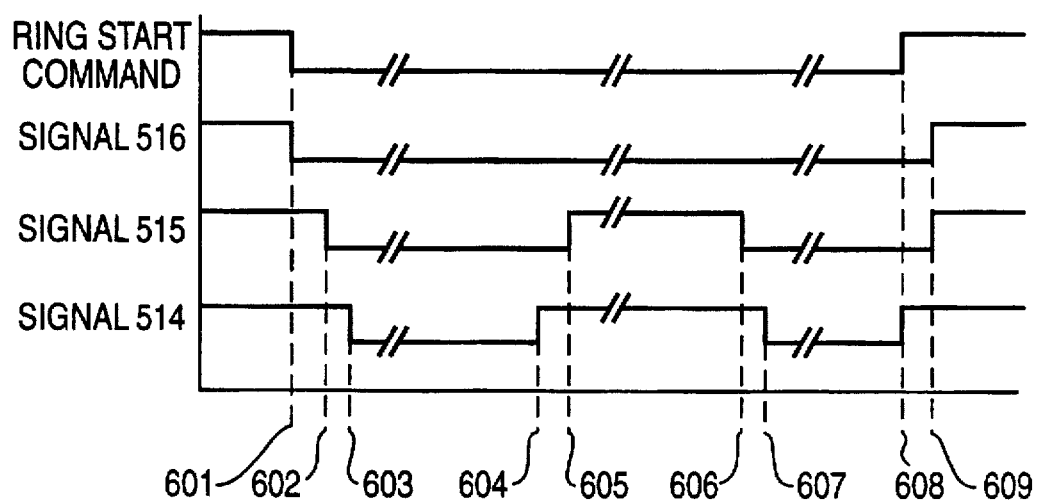
FIG. 6: Illustrates the timing activation of the present invention.

Referring to FIGS. 5 and 6. The drive signals for all three pairs of switches (503 through 508) are leads 514, 515, and 516. Resistors 517, 518, and 519 set the LED currents for the switches when the leads are activated (grounded) by circuit 101. In FIG. 6, the timing of activation of leads 514, 515, and 516, is shown. Prior to time 601, the ring signal generator is inactive. A DC path exists between terminals A 520, and B 522 through switches 503 and 505 and optionally through switch 507. At time 601, optional path through switch 507 is opened. At time 602, resistor 510 is connected across terminals A 520, and B 522 through switches 504 and 505. At time 603, resistor 510 is removed, and drive pulses 104 for transistor 501 begin to be generated with an increasing pulse width. The bridge connections cause terminal A 520 to be negative relative to terminal B 522. At time 604, drive pulses to transistor 501 have been reduced back to zero duty cycle and resistor 510 is reconnected between terminals A 520 and B 522 to drain off any remaining charge. At time 605, resistor 510 is removed, and the drive pulses for transistor 501 begin their pulse width modulation cycle again. The bridge connections cause terminal A 520 to be positive relative to terminal B 522. Times 606, 607, 608 and 609, are the same as times 602, 603, 604, and 605 except for output polarity. The ring signal cycles beginning at time 602 through 608 are typically generated many times before the ring signal generator is commanded off at time 609. At time 609, the ring signal generator is removed from the circuit and the circuit state is the same as prior to time 601.

What is claimed is:

1. A ring signal generator comprising:
   (a) a digital control circuit having memory;
   (b) a DC to DC converter connected to the digital control circuit;
   (c) control logic stored in the memory of the digital control circuit;
   (d) the control logic adapted to provide first control instructions to the DC to DC converter to provide a cyclic waveform resembling full wave rectified sine waves; and
   (e) a switching bridge connected to the digital control circuit adapted to receive second control instructions from the digital control circuit control logic, where the second control instructions instruct the switching bridge to create a full sine wave by inverting the polarity of every other cycle of the DC to DC converter output waveform.

2. The ring signal generator of claim 1, further comprising a DC path between the AC output terminals of the switching bridge when the switching bridge is turned off.

3. The ring signal generator of claim 1, further comprising a resistor connected to the output of the DC to DC converter and adapted to bleed off residual voltage, wherein at the end of each half cycle of the output waveform the output terminals of the DC to DC converter are disconnected and are connected to the resistor to bleed off residual voltage that may have accumulated on a capacitive load during the preceding half cycle.

4. The ring signal generator of claim 1, further comprising high voltage isolation between the signal being switched and the signals used to control the switching.

5. The ring signal generator of claim 4, further comprising control logic instructions to control output frequencies of the ring signal generated.

6. The ring signal generator of claim 4, further comprising control logic instructions to control on/off cadence of the ring signal generated.

* * * * *